United States Patent [19] [11] Patent Number: 5,033,831
Sigler [45] Date of Patent: Jul. 23, 1991

[54] COLOR-CORRECTED LENS TRIPLETS WITH LIQUID LENS ELEMENTS

[75] Inventor: Robert D. Sigler, Cupertino, Calif.

[73] Assignee: Lockheed Missiles & Space Company, Inc., Sunnyvale, Calif.

[21] Appl. No.: 520,001

[22] Filed: May 7, 1990

Related U.S. Application Data

[63] Continuation-in-part of Ser. No. 449,439, Dec. 11, 1989, Pat. No. 4,958,919, which is a continuation of Ser. No. 260,106, Oct. 20, 1988, abandoned.

[51] Int. Cl.[5] .................... G02B 3/12
[52] U.S. Cl. .................... 350/418; 350/483
[58] Field of Search .................... 350/418, 419, 483

[56] References Cited

U.S. PATENT DOCUMENTS 2,490,873 12/1949 Johnson .................... 350/418
4,911,538 3/1990 Robb .................... 350/418
4,913,535 4/1990 Robb .................... 350/418
4,915,483 4/1990 Robb .................... 350/418
4,932,762 6/1990 Robb .................... 350/418
4,950,041 8/1990 Robb .................... 350/418
4,958,919 9/1990 Sigler .................... 350/418

*Primary Examiner*—Bruce Y. Arnold
*Assistant Examiner*—Rebecca D. Gass
*Attorney, Agent, or Firm*—John J. Morrissey

[57] ABSTRACT

A family of achromatic lens triplets and an apochromatic lens triplet are described, each of which consists of a fluidal liquid lens element (viz., Cargille 550206 liquid) contained between a Schott BK 7 glass lens element and a Schott F2 glass lens element.

8 Claims, 2 Drawing Sheets

FIG_1
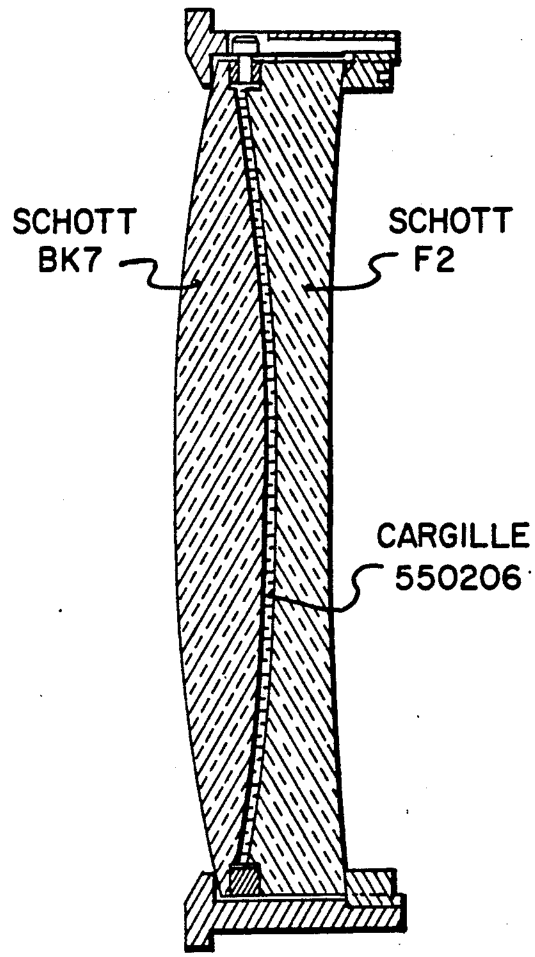
FIG_2
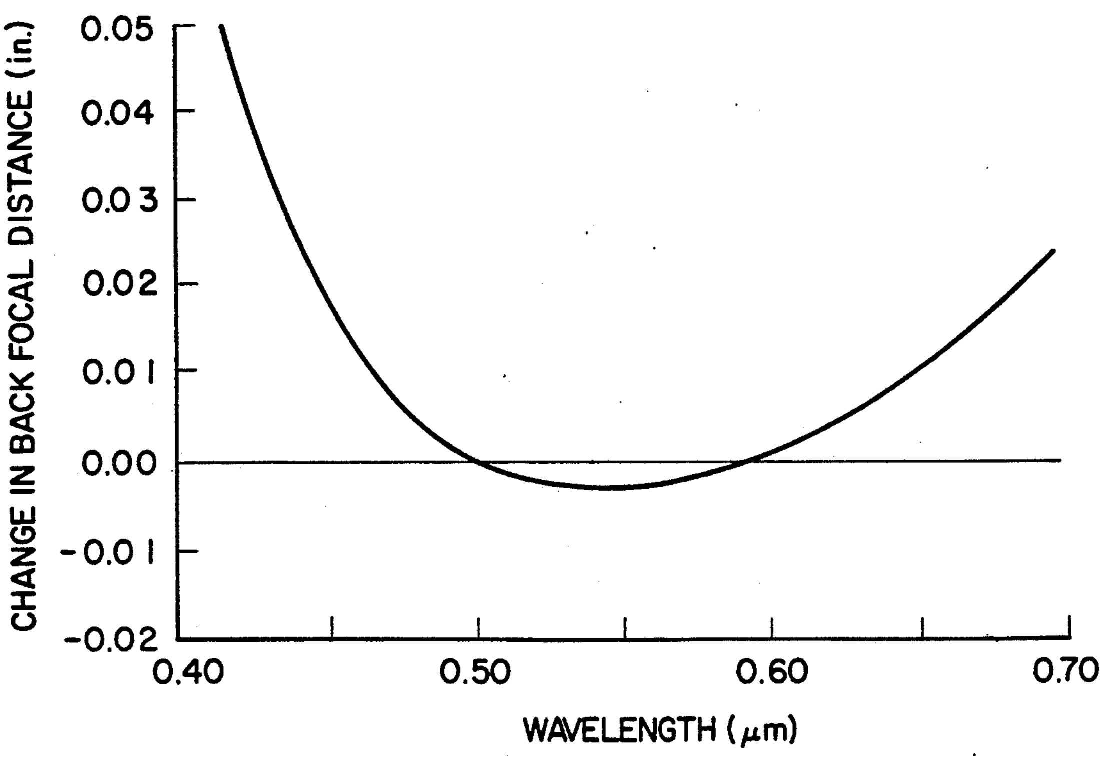

FIG_3
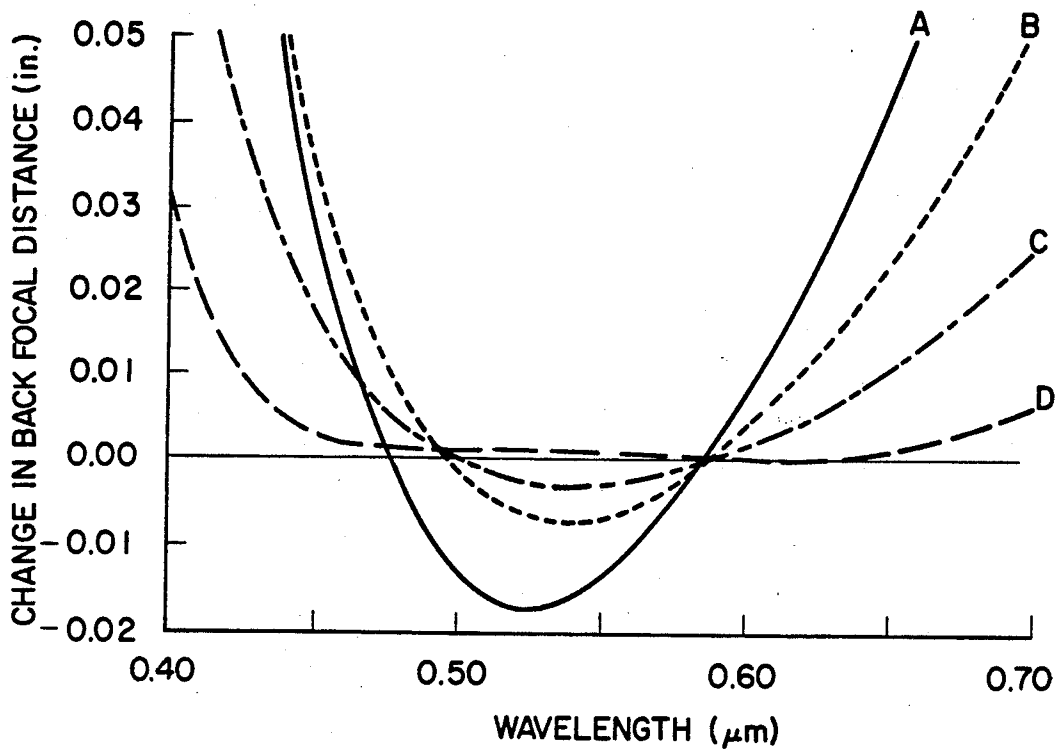
FIG_4
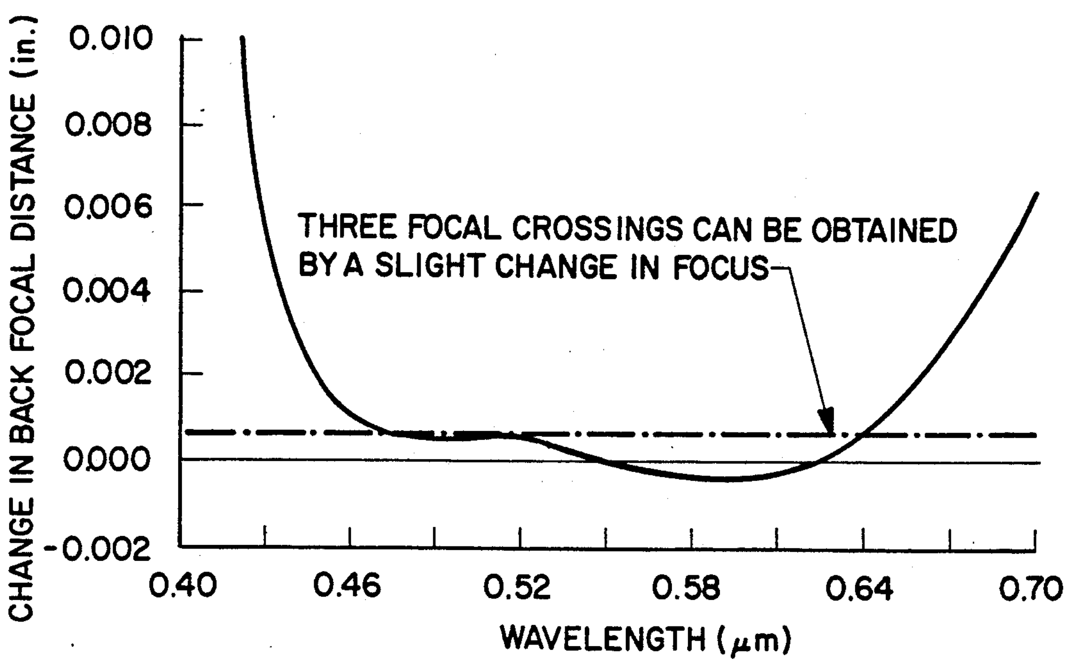

COLOR-CORRECTED LENS TRIPLETS WITH LIQUID LENS ELEMENTS

This application is a continuation-in-part of patent application Ser. No. 449,439 filed on Dec. 11, 1989 (now U.S. Pat. No. 4,958,919 issued on Sept. 25, 1990), which was a continuation of patent application Ser. No. 260,106 filed on Oct. 20, 1988 (now abandoned).

TECHNICAL FIELD

This invention relates generally to color-corrected optical systems, and more particularly to a technique for selecting liquid lens elements in designing color-corrected lens triplets.

BACKGROUND OF THE INVENTION

The contents of the aforesaid patent U.S. Pat. No. 4,958,919 are incorporated herein by reference.

A technique was described in the aforesaid patent U.S. Pat. No. 4,958,919 for designing color-corrected optical systems using fluidal liquids as refractive elements. Examples were also disclosed of color-corrected lens systems designed according to the described technique, which have one or more liquid lens elements. One example of a color-corrected lens system disclosed in patent U.S. Pat. No. 4,958,919 was a lens triplet comprising a liquid lens element made of a Cargille liquid (identified by the code number 550206) having abnormal dispersion properties, which is confined between two glass lens elements (made of Schott BK7 and Schott F2 optical glasses, respectively) having normal dispersion properties. That particular lens triplet (which was shown in FIG. 3 of patent U.S. Pat. No. 4,958,919) is illustrated herein in FIG. 1, and has an optical prescription specified in tabular format as follows:

TABLE I

| Surface No. | Radius (inches) | Thickness (inches) | $N_D$ | $V_D$ | Material |
|---|---|---|---|---|---|
| 1 | 17.615 | 0.650 | 1.5168 | 64.15 | BK7 |
| 2 | −23.491 | 0.067 | 1.5500 | 20.60 | 550206 |
| 3 | −18.072 | 0.350 | 1.6200 | 36.37 | F2 |
| 4 | 83.867 | 58.150 | | | Air |

where the surfaces of the lens elements comprising the triplet are numbered consecutively from left to right in accordance with optical design convention. The "radius" listed for each surface is the radius of curvature of the surface expressed in inches. The radius of curvature of a surface is said to be positive if the center of curvature of the surface lies to the right of the surface, and negative if the center of curvature of the surface lies to the left of the surface. The "thickness" listed for a given surface is the thickness of the lens element bounded on the left by the given surface, or the thickness of the gap between the given surface and the next surface to the right thereof, where the thickness is measured in inches along the optic axis of the system.

The heading $N_D$ in the next column of Table I refers to the refractive index of the lens element bounded on the left by the indicated surface, where the value of the refractive index is given for the sodium D line, i.e., for a base wavelength of 0.5893 micron. The heading $V_D$ refers to the Abbe number for the particular lens element at the same base wavelength. The "material" listed in Table I for each surface refers to the type of optical material from which the lens element bounded on the left by the indicated surface is made.

A conventional measure of performance of an optical system is obtained by plotting the change in back focal distance as a function of wavelength over the spectral band in which the optical system is intended to operate. In FIG. 2, the change in back focal distance as a function of wavelength relative to an arbitrarily selected focal surface (here, the surface at which the focal distance is optimum for a wavelength of 0.5876 micron) is plotted for the lens triplet of FIG. 1. From the two crossings of the horizontal (i.e., wavelength) axis by the curve in FIG. 2, it is apparent that the lens triplet of FIG. 1 is achromatic (i.e., color-corrected at two wavelengths). However, from the shallowness of the curve in FIG. 2 relative to the horizontal axis, it is also apparent that the lens triplet of FIG. 1 has a significantly reduced residual chromatic aberration (i.e., secondary spectrum) in comparison with typical achromats of the prior art.

SUMMARY OF THE INVENTION

It is an object of the present invention to provide a family of achromatic lens triplets of low residual chromatic aberration, which are derived from the particular lens triplet shown in FIG. 1.

It is also an object of the present invention to derive an apochromatic lens triplet that is well-corrected for monochromatic aberrations from the particular lens triplet shown in FIG. 1.

In accordance with the present invention, optical prescriptions are provided for a family of achromatic lens triplets, and for an optimized apochromatic lens triplet, derived from the lens triplet of FIG. 1.

DESCRIPTION OF THE DRAWING

FIG. 1 is a profile drawing of an achromatic lens triplet consisting of a liquid lens element made of a Cargille liquid identified by the code number 550206, which is contained between two glass lens elements made of Schott BK7 and Schott F2 optical glasses, respectively.

FIG. 2 is a plot of the change in back focal distance as a function of wavelength for the lens triplet of FIG. 1.

FIG. 3 is a set of superimposed plots of the change in back focal distance as a function of wavelength for a family of achromatic lens triplets, each of which consists of a liquid lens element made of a Cargille liquid identified by the code number 550206 sandwiched between two glass lens elements made of Schott BK7 glass and Schott F2 glass.

FIG. 4 is a plot of the change in back focal distance as a function of wavelength for an apochromatic lens triplet derived from the lens triplet of FIG. 1.

BEST MODE OF CARRYING OUT THE INVENTION

U.S. Pat. No. 4,958,919 (the specification and drawing of which are incorporated herein by reference as if fully set forth in extenso) included a discussion of an achromatic doublet whose lens elements are made of Schott BK7 glass and Schott F2 glass, and an apochromatic doublet whose lens elements are made of Schott FK51 glass and Schott KZFSN2 glass, and also contained a disclosure of two novel lens systems as follows:

a) the achromatic lens triplet with reduced residual chromatic aberration that is illustrated in FIG. 1 of the present patent application, which consists of a liquid lens element made of a Cargille liquid identified by the code number 550206 contained between two glass lens elements made of Schott BK7 glass and Schott F2 glass; and b) an apochromatic lens quintuplet consisting of a glass lens element made of Schott BK7 glass, a liquid lens element made of a Cargille liquid identified by the code number 550206, a glass lens element made of Schott F2 glass, a liquid lens element made of a Cargille liquid identified by the code number 400513, and another glass lens element made of Schott BK7 glass.

In order to facilitate verification of the optical prescriptions given in the aforementioned U.S. Pat. No. 4,958,919 and in the present patent application, it would be convenient for refractive index data for the Schott BK7, Schott F2, Schott FK51, Schott KZFSN2, Cargille 400513 and Cargille 550206 optical materials at certain specified wavelengths in the visible region of the spectrum to be published in a single document. Therefore, refractive indices for the indicated materials are listed for the specified wavelengths as follows:

TABLE II

| Wavelength (micron) | Schott BK7 | Schott F2 | Schott FK51 | Schott KZFSN2 | Cargille 400513 | Cargille 550206 |
|---|---|---|---|---|---|---|
| 0.4800 | 1.52283 | 1.63310 | 1.49088 | 1.56610 | 1.4059 | 1.5715 |
| | (1.522856) | (1.633701) | | | (1.405906) | (1.571953) |
| 0.4861 | 1.52238 | 1.63208 | 1.49056 | 1.56552 | 1.4055 | 1.5697 |
| | (1.522407) | (1.632680) | | | (1.405479) | (1.570160) |
| 0.5461 | 1.51872 | 1.62408 | 1.48794 | 1.56082 | 1.4019 | 1.5564 |
| | (1.518753) | (1.624664) | | | (1.401977) | (1.556626) |
| 0.5876 | 1.51680 | 1.62004 | 1.48656 | 1.55836 | 1.4001 | 1.5502 |
| | (1.516831) | (1.620619) | | | (1.400123) | (1.550250) |
| 0.5893 | 1.51673 | 1.61989 | 1.48651 | 1.55827 | 1.4000 | 1.5500 |
| | (1.516761) | (1.620465) | | | (1.400055) | (1.550025) |
| 0.6438 | 1.51472 | 1.61582 | 1.48508 | 1.55571 | 1.3981 | 1.5442 |
| | (1.514752) | (1.616308) | | | (1.398116) | (1.543933) |
| 0.6563 | 1.51432 | 1.61503 | 1.48480 | 1.55521 | 1.3977 | 1.5431 |
| | (1.514352) | (1.615601) | | | (1.397730) | (1.542790) |

where the values not enclosed within parentheses in the above list were taken from catalog data provided by the manufacturers, and where the values enclosed within parentheses were obtained from precision refractive index measurements made on specific melts (in the case of the optical glasses) or on specific lots (in the case of the Cargille liquids) used in constructing lens systems as defined by the optical prescriptions given in U.S. Pat. No. 4,958,919.

It is instructive to consider the effect of the optical power of a liquid lens element upon performance of a color-corrected lens triplet such as the achromatic lens triplet illustrated in FIG. 1. Accordingly, an optical prescription for an achromatic lens triplet consisting of a liquid lens element made of a Cargille liquid identified by the code number 550206, which is contained between two glass lens elements made of Schott BK7 and Schott F2 optical glasses, where the optical power of the liquid lens element is zero (i.e., the curvatures of the two sides of the liquid lens element are substantially equal to each other), is provided as follows:

TABLE III

| Surface No. | Radius (inches) | Thickness (inches) | $N_D$ | $V_D$ | Material |
|---|---|---|---|---|---|
| 1 | 28.350 | 0.650 | 1.5168 | 64.15 | BK7 |
| 2 | −26.089 | 0.001 | 1.5500 | 20.60 | 550206 |
| 3 | −26.089 | 0.350 | 1.6200 | 36.37 | F2 |
| 4 | −259.687 | 59.363 | | | Air |

where the surfaces of the lens elements listed in Table III are numbered consecutively from left to right according to the convention explained above for Table I.

In FIG. 3, the change in back focal distance as a function of wavelength is plotted as Curve A for the lens triplet defined by the optical prescription given in Table III wherein the liquid lens element has zero optical power. Curve A is substantially the same as the curve that would be obtained by plotting the change in back focal distance as a function of wavelength for an achromatic lens doublet comprising just lens elements made of Schott BK7 glass and Schott F2 glass (i.e., without a third lens element made of a liquid having abnormal dispersion properties). In other words, insertion of a liquid lens element of zero optical power between the two glass lens elements of an achromatic lens doublet does not significantly change the performance of the lens doublet.

However, if the optical prescription given in Table III were to be changed slightly so that the liquid lens element would have a relatively small optical power as follows:

TABLE IV

| Surface No. | Radius (inches) | Thickness (inches) | $N_D$ | $V_D$ | Material |
|---|---|---|---|---|---|
| 1 | 21.745 | 0.650 | 1.5168 | 64.15 | BK7 |
| 2 | −25.756 | 0.030 | 1.5500 | 20.60 | 550206 |
| 3 | −22.418 | 0.350 | 1.6200 | 36.37 | F2 |
| 4 | 223.311 | 59.122 | | | Air |

where the surfaces of the lens elements listed in Table IV are likewise numbered consecutively from left to right according to the convention explained above for Table I, performance would be noticeably improved by a corresponding reduction in secondary spectrum. Performance of the lens triplet defined by the optical prescription given in Table IV is indicated by a plot of the change in back focal distance as a function of wavelength shown as Curve B in FIG. 3.

Curve C in FIG. 3 is a repetition of the plot of the change in back focal distance as a function of wavelength (as shown in FIG. 2) for the achromatic lens triplet illustrated in FIG. 1, as defined by the optical prescription given in Table I. The shallowness of Curve C relative to the horizontal axis in FIG. 3 indicates that residual chromatic aberration (i.e., secondary spectrum) is very small in the spectral region between the two wavelengths at which chromatic aberration is zero (i.e., the two wavelengths for which color-correction has been achieved) for the lens triplet of FIG. 1.

The optical prescriptions specified in Tables I, III and IV defining three different lens triplets consisting of a Cargille 550206 liquid lens element contained between a Schott BK7 glass lens element and a Schott F2 glass lens element (for which the corresponding three Curves A, B and C plotted in FIG. 3 indicate the change in back focal distance as a function of wavelength) were all based upon a 6-inch aperture and an f/10 focal ratio, and on a nominally zero focus at 0.5876 micron. Thus, Curves A, B and C in FIG. 3 represent a family of achromatic lens triplets. By comparing Curves A, B and C, it becomes apparent that performance improves (i.e., residual chromatic aberration decreases) with increasing optical power of the liquid lens element.

It has been found that even better performance can be achieved for a lens triplet in the same family as those lens triplets represented by Curves A, B and C in FIG. 3. Thus, if the optical power of the liquid lens element of the lens triplet illustrated in FIG. 1 is increased further in accordance with an optical prescription as follows:

TABLE V

| Surface No. | Radius (inches) | Thickness (inches) | $N_D$ | $V_D$ | Material |
|---|---|---|---|---|---|
| 1 | 17.750 | 0.650 | 1.5168 | 64.15 | BK7 |
| 2 | −22.312 | 0.094 | 1.5500 | 20.60 | 550206 |
| 3 | −15.952 | 0.350 | 1.6200 | 36.37 | F2 |
| 4 | 58.541 | 58.688 | | | Air |

where the surfaces of the lens elements listed in Table V are likewise numbered consecutively from left to right according to the convention explained above for Table I, a performance as indicated by Curve D in FIG. 3 is obtained. For the sake of clarity, Curve D of FIG. 3 is plotted again in expanded scale in FIG. 4.

The curve in FIG. 4 (i.e., Curve D in FIG. 3), which represents the change in back focal distance as a function of wavelength for the lens triplet defined by the optical prescription given in Table V, crosses the horizontal axis at two wavelengths when nominally focussed for a wavelength of 0.5876 micron. However, it is apparent from the shallowness of the curve in FIG. 4 that residual chromatic aberration for the lens triplet defined by the optical prescription given in Table V is very small, and that a slight refocussing of the lens triplet to a wavelength of approximately 0.64 micron (i.e., a shift in focus of about 0.0007 inch) will cause the curve in FIG. 4 to make three crossings of the horizontal axis, which is a characteristic of an apochromat.

For an achromatic lens system comprising lens elements made only of optical materials having normal dispersive properties, no amount of refocussing of the system could produce a focal position that would allow more than two crossings of the horizontal (i.e., wavelength) axis by a the curve plotting the change in back focal distance as a function of wavelength. In contrast, the lens triplet defined by the optical prescription given in Table V does have a focal position that allows three crossing of the horizontal axis by the curve plotting the change in back focal distance as a function of wavelength. Thus, the lens triplet defined by the optical prescription given in Table V can be called an apochromat, provided that an appropriate focus is specified. Of more practical significance, however, is the fact that the lens triplet defined by the optical prescription given in Table V has an extremely small residual chromatic aberration over a broad band of visible wavelengths.

This invention has been described above in terms of particular color-corrected lens systems. However, other color-corrected lens systems in accordance with the present invention could be designed using fluidal liquids having abnormal dispersion properties as refractive elements. Therefore, the particular lens systems described above are to be understood as merely illustrative of the invention, which is defined more generally by the following claims and their equivalents.

I claim:

1. A color-corrected lens system comprising a plurality of lens elements, a first one and a second one of said lens elements being rigid lens elements having normal optical dispersion, a third one of said lens elements being a liquid lens element having abnormal optical dispersion, said plurality of lens elements being configured and positioned with respect to each other so as to achieve color correction of said system at two wavelengths.

2. The lens system of claim 1 wherein said first and second rigid lens elements are made of Schott BK7 glass and Schott F2 glass, respectively, and said liquid lens element having abnormal dispersion is made of a Cargille liquid identified by the code designation 550206.

3. The lens system of claim 1 wherein said liquid lens element has a non-zero optical power.

4. The lens system of claim 2 wherein said plurality of lens elements comprises a triplet whose optical prescription is as follows:

| Surface No. | Radius (inches) | Thickness (inches) | $N_D$ | $V_D$ | Material |
|---|---|---|---|---|---|
| 1 | 17.615 | 0.650 | 1.5168 | 64.15 | BK7 |
| 2 | −23.491 | 0.067 | 1.5500 | 20.60 | 550206 |
| 3 | −18.072 | 0.350 | 1.6200 | 36.37 | F2 |
| 4 | 83.867 | 58.150 | | | Air |

5. The lens system of claim 2 wherein said plurality of lens elements comprises a triplet whose optical prescription is as follows:

| Surface No. | Radius (inches) | Thickness (inches) | $N_D$ | $V_D$ | Material |
|---|---|---|---|---|---|
| 1 | 21.745 | 0.650 | 1.5168 | 64.15 | BK7 |
| 2 | −25.756 | 0.030 | 1.5500 | 20.60 | 550206 |
| 3 | −22.418 | 0.350 | 1.6200 | 36.37 | F2 |
| 4 | 223.311 | 59.122 | | | Air |

6. The lens system of claim 2 wherein said lens elements are configured and positioned with respect to each other so as to achieve color correction of said system at three wavelengths.

7. The lens system of claim 6 wherein said plurality of lens elements comprises a triplet whose optical prescription is as follows:

| Surface No. | Radius (inches) | Thickness (inches) | $N_D$ | $V_D$ | Material |
|---|---|---|---|---|---|
| 1 | 17.750 | 0.650 | 1.5168 | 64.15 | BK7 |
| 2 | −22.312 | 0.094 | 1.5500 | 20.60 | 550206 |
| 3 | −15.952 | 0.350 | 1.6200 | 36.37 | F2 |
| 4 | 58.541 | 58.688 | | | Air |

8. The lens system of claim 2 wherein said plurality of lens elements comprises a triplet whose optical prescription is as follows:

| Surface No. | Radius (inches) | Thickness (inches) | $N_D$ | $V_D$ | Material |
|---|---|---|---|---|---|
| 1 | 28.350 | 0.650 | 1.5168 | 64.15 | BK7 |

-continued

| Surface No. | Radius (inches) | Thickness (inches) | $N_D$ | $V_D$ | Material |
|---|---|---|---|---|---|
| 2 | −26.089 | 0.001 | 1.5500 | 20.60 | 550206 |
| 3 | −26.089 | 0.350 | 1.6200 | 36.37 | F2 |
| 4 | −259.687 | 59.363 | | | Air |

* * * * *